(12) United States Patent
Narayanan et al.

(10) Patent No.: US 8,275,985 B1
(45) Date of Patent: Sep. 25, 2012

(54) INFRASTRUCTURE TO SECURE FEDERATED WEB SERVICES

(75) Inventors: Srividhya Narayanan, Sunnyvale, CA (US); Rajeev Angal, Santa Clara, CA (US); Malla V. Simhachalam, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 957 days.

(21) Appl. No.: 11/694,001

(22) Filed: Mar. 30, 2007

Related U.S. Application Data

(63) Continuation-in-part of application No. 11/462,780, filed on Aug. 7, 2006.

(51) Int. Cl.
*H04L 29/06* (2006.01)
(52) U.S. Cl. ............ 713/160; 713/150; 713/189; 726/11
(58) Field of Classification Search .................. 713/160
See application file for complete search history.

(56) References Cited

U.S. PATENT DOCUMENTS

| | | | | |
|---|---|---|---|---|
| 7,003,118 | B1 * | 2/2006 | Yang et al. | 380/287 |
| 2001/0011296 | A1 * | 8/2001 | Chidambaran et al. | 709/203 |
| 2001/0014008 | A1 * | 8/2001 | Allirot | 361/683 |
| 2003/0110097 | A1 * | 6/2003 | Lei | 705/27 |
| 2004/0128546 | A1 * | 7/2004 | Blakley et al. | 713/201 |
| 2004/0167984 | A1 * | 8/2004 | Herrmann | 709/229 |
| 2006/0174120 | A1 * | 8/2006 | Rippy et al. | 713/171 |
| 2006/0174323 | A1 * | 8/2006 | Brown et al. | 726/3 |
| 2006/0184937 | A1 * | 8/2006 | Abels et al. | 718/1 |

OTHER PUBLICATIONS

Liberty Alliance Project, "Liberty Specs Tutorial," www.projectliberty.org.
Microsoft Corporation, Chapter 7—"WS-I BSP Interoperability Guidance", Patterns & Practices, May 2006.
"Liberty Alliance Project—a Technology Overview", Slide Presentation, Date Unknown.
"Introduction to Liberty Alliance", Slide Presentation, Date Unknown.

* cited by examiner

*Primary Examiner* — Edward Zee
*Assistant Examiner* — Yogesh Paliwal
(74) *Attorney, Agent, or Firm* — Martine Penilla Group, LLP

(57) ABSTRACT

A federation participant in communication with other participants of a federation according to a federation protocol is described. The web service participant includes business logic and a security provider. The business logic implements a web service consumer (WSC) or a web service provider (WSP) business logic. The business logic is configured to generate an outgoing message for transmission to a recipient and receive an incoming message from the recipient, the recipient being a WSP if the business logic is a WSC business logic and a WSC if the business logic is a WSP business logic. The security provider is configured to receive the generated messages and apply header information to the outgoing message according to the federation protocol to form a modified outgoing message. The security provider then transmits the modified outgoing message to the recipient. Methods of operation for the WSC and WSP are also described.

20 Claims, 9 Drawing Sheets

INFRASTRUCTURE TO SECURE FEDERATED WEB SERVICES

CLAIM OF PRIORITY

This application is a continuation-in-part application under 35 U.S.C. §120 and claims priority from U.S. patent application Ser. No. 11/462,780 entitled, "Deployment Tool And Method For Managing Security Lifecycle Of A Federated Web Service" filed on Aug. 7, 2006, which is incorporated herein by reference.

BACKGROUND

Many services provided through the Internet require that the user first be authenticated before the services can be provided. "Authentication" is the process of attempting to verify the identity of the sender of a communication. The sender being authenticated may be a person using a computer, a computer itself or a computer program. For example, when accessing a bank account, a user may be required to log in by providing a username and password combination before the bank records can be accessed. Traditionally, a single service provider both authenticates the user and provides the service.

This unified authenticator/service provider model has led to a proliferation of disconnected online user identities, and reduces privacy and convenience of users. Privacy is compromised when a user is asked to identify himself to the service provider for even minimal privileges. Each service provider may therefore maintain private information regarding the user that is subject to theft or misuse. Convenience is compromised by having to manage multiple usernames and passwords for various online activities.

To overcome the disadvantages associated with the traditional centralized model, the federated model has been proposed and implemented by various entities, such as the Liberty Alliance Project (LAP) and the OASIS WS-Security and associated Web Services Interoperability Organization (WS-I). Protocols developed by these organizations allow a web service provider to delegate authentication and/or authorization tasks to a trusted identity provider. This improves the convenience and privacy of the user e.g., by providing a single sign-on (SSO) capability, and gives the user more control over personal information.

FIG. 1 shows an exemplary implementation of a web service federation 10. In this example, user 12 accesses web service consumer (WSC) 14. WSC 14 may be an Internet portal providing weather, stock information, banking information to user 12 via an Internet connection 15. Alternatively, WSC 14 may be an application such as a video-on-demand device for accessing streaming multimedia content. Any device or computer requiring interoperation with a web service provider may be regarded as a WSC. Web service provider (WSP) 16 is an entity that provides services and/or goods to the WSC. WSP 16 provides the requested data or performs a requested action on behalf of WSC 14. Identity provider (IDP) 18 authenticates user 12 and/or WSC 14 to WSP 16, depending on the authentication requirements of the WSP.

WSC 14 has several choices when invoking a WSP. It could invoke the WSP on the user's behalf, in which case the WSP will verify the user's credentials. It could also invoke the WSP on the user's behalf but additionally present its own credentials, in which case the WSP will verify both. Alternatively, the WSC can invoke the WSP in its own right. When a WSC invokes a WSP in its own right, the WSC would have already authenticated the user's identity and a pre-existing relationship exists between the WSC and the WSP, e.g., brokered via the trusted authority 19, that allows the WSP to only verify WSC credentials. The trusted authority provides a registry for federation members and the services that they provide along with authentication requirements. The trusted authority therefore brokers trust between the WSC 14 and WSP 16. In LAP federations, the trusted authority is referred to as a discovery service. It should be noted that from a lifecycle perspective, the trusted authority is not always required. For example, the WSP may be preconfigured with the correct and acceptable authentication mechanisms and WSP endpoint(s). Furthermore, in many cases, the identity provider and trusted authority may be co-located, i.e., the trusted authority may be part of the identity provider.

Each Internet connection 15, which places each of the components of the web service federation 10 in communication with each other, may comprise any of various technologies enabling secure communication. For example, Internet connections 15 may each comprise a transmission control protocol (TCP) connection over which messages are passed by hypertext transfer protocol (HTTP) with transport layer security (TLS), thereby providing a secured, encrypted connection over the Internet. TLS is the successor to the secure sockets layer (SSL) specification. It can be seen that for the web service federation to function, WSC 14, WSP 16, IDP 18, and trusted authority 19 must work together in what is known as a "circle of trust" 20. The phrase, "circle of trust" refers to a group of service providers and identity providers that have business relationships based on a federated architecture and operational agreements and with whom users can transact business in a secure and apparently seamless environment.

FIG. 2 shows a swimlane diagram 50 illustrating an exemplary transaction for supplying federated web services from WSP 16 to WSC 14 and user 12. Exemplary web services could include weather, stock, banking, or multimedia data. User 12 initially submits a request 52 to WSC 14. The request may be made over an Internet connection or locally. The WSC application then sends a SOAP message 54 to WSP 16 to invoke the service. A SOAP message is a message sent using the SOAP protocol, a well-known, widely available protocol for exchanging extensible markup language (XML) based messages over a computer network, typically on top of an HTTP layer. If WSP 16 requires authentication of user 12 prior to supplying the particular service requested, it may send a redirect message 56 to WSC 14, to redirect WSC 14 to IDP 18, for authentication.

WSC 14 then contacts IDP 18 and sends an assertion request 58. The request may include any of various identifying information from user 12, such as a username and password or smart card token. If sufficient, IDP 18 responds with an assertion 60, including a security token. One example of such a security token is a Security Assertion markup Language (SAML) security token, which is a signed message that can be authenticated by WSP 16. The type of security token can be selected by WSC 14. If WSC 14 is not aware of the needed type, then WSC 14 can send interact with trusted authority 19 (FIG. 1) to identify the types of security tokens are that are acceptable by WSP 16. WSC 14 then sends a new invoke message 62, this time including the security token, which assures WSP 16 that user 12 is sufficiently authenticated by IDP 18, which issued the token.

It should be noted here that WSP 16 does not require a separate username and password of user 12, and the username and password need not be stored with the WSP 16. Any number of WSPs can work with IDP 18 to obtain such authentication. Furthermore, the assertion requested and delivered by IDP 18 may be limited to specific facts about the user, rather than the user's actual identity. This is sometimes referred to as a blind credential. For example, if the web service is simply providing a weather forecast, the assertion may provide that the user has authorization to view the weather forecast, and further, the user's zip code (or other geographical identifier such as a city name) so that the weather forecast can be tailored to the user's geographical location.

LAP architecture currently includes specifications for over 20 different security token types and WS-I architecture supports four security tokens. Some of the security tokens supported by LAP and WS-I are SAML security tokens. Each token type can provide a different type of security mechanism, from no additional security (relying instead on the underlying SSL/TLS on top of which HTTP and other transfer protocols are provided) to very strong security. A variety of security mechanisms may therefore be implemented using the various SAML security tokens. This provides flexibility according to need. For example, stronger SAML security tokens provide enhanced security for protecting sensitive information, while weaker SAML security tokens require fewer resources. The level of security can therefore be tailored to the sensitivity of the information being provided to or from the WSP, as well as other considerations.

Since LAP, WS-I, and other security standards bodies only provide specifications for the protocol and schema specifications for interoperation between the WSC and the WSP, the standards and specification do not manage internal functionality of each of the members of the federation. Currently, federation protocols are typically hand-programmed into the business logic at both ends of the conversation. This causes difficulties during the lifecycle of the web service provider due to changes in business requirements and security needs. As a result, a large cost is incurred in manually redeploying an application when new or different security mechanisms or new business logics are required to be incorporated therein.

SUMMARY

Broadly speaking, the present invention tills these needs by providing a deployment tool and method for managing security lifecycle of a Federated web service. It should be appreciated that the present invention can be implemented in numerous ways, including as a process, an apparatus, a system, a device, or a method. Several inventive embodiments of the present invention are described below.

In one embodiment, a federation participant is provided. The federation participant is in communication with other participants of a federation according to a federation protocol. The federation participant includes a business logic and a security provider, each being a software component configured to execute within a container. The business logic being one of a web service consumer (WSC) business logic or a web service provider (WSP) business logic. The business logic is configured to generate an outgoing message for transmission to a recipient and receive an incoming message from the recipient. The recipient is a WSP if the business logic is a WSC business logic and a WSC if the business logic is a WSP business logic. The security provider is configured to execute in the container with the business logic. The security provider receives the generated messages and applies header information to the outgoing message according to the federation protocol to form a modified outgoing message. The security provider then transmits the modified outgoing message to the recipient.

In another embodiment, a method for accessing a web service provider (WSP) at a web service consumer (WSC) is provided. In the method, a WSC business logic is used to generate an original query message. The original query message is received in a security provider. The security provider identifies a WSP that is an intended recipient of the original query message and processes the original query message to generate a modified query message, the modified query message including a header and security mechanism according to requirements of the WSP. The modified query message is transmitted to the WSP over a network from the security provider. The WSC business logic and the security provider are each a distinct software module executing within a container.

In yet another embodiment, a method for providing a web service at a web service provider (WSP) to a web service consumer (WSC) is provided. In the method, a query message is received in a security provider from a WSC over a network. A security mechanism incorporated into the query message is identified. The security provider verifies that the security mechanism corresponds to an acceptable type of security mechanism according to a policy of the WSP. The security mechanism is validated, the validating including determining that the WSC is authenticated and that the message integrity is not compromised. A message body is extracted from the query message. The message body is sent to WSP business logic from the security provider, wherein the security provider and the business logic each comprise a distinct software module executing within a container.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

The technology described herein relates web services that are members of a web services federation. A web service is an implementation of a remote procedure call that is available over a network, and is generally available over the TCP/IP protocol layers of the Internet. The term "web service" derives from the fact that these same protocol layers are utilized by the world wide web, and is not intended to imply that they are necessarily directly accessible to users using a web browser. A web services federation is an association of web services, consumers, one or more identity providers, and any number of trusted authorities.

The term "user" as used herein, may refer to an individual interacting with a web services consumer (WSC) which in turn accesses a web services provider (WSP) or it could be the person developing, deploying, or managing a web services provider WSP. In some instances, the person developing, deploying, or managing the web services provider will be referred to herein as "deployer." The technology described herein is able to both hide and separate security mechanisms handling logic from the business logic module and simplify implementation of the federation protocol for the deployer.

Figure 1:
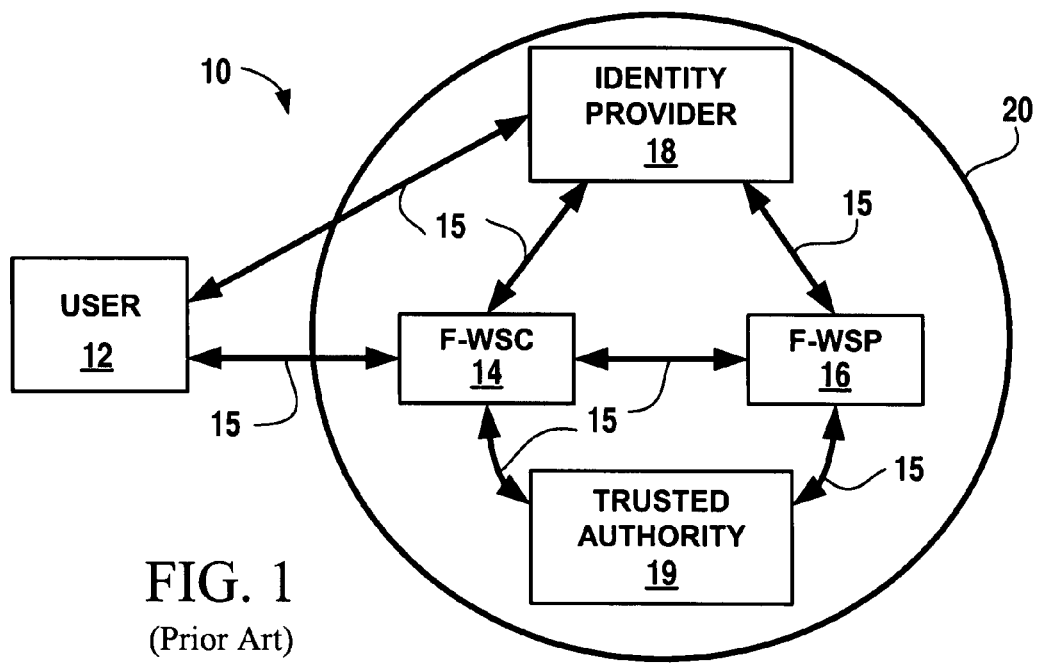
FIG. 1 shows an exemplary implementation of a web service federation.
Figure 2:
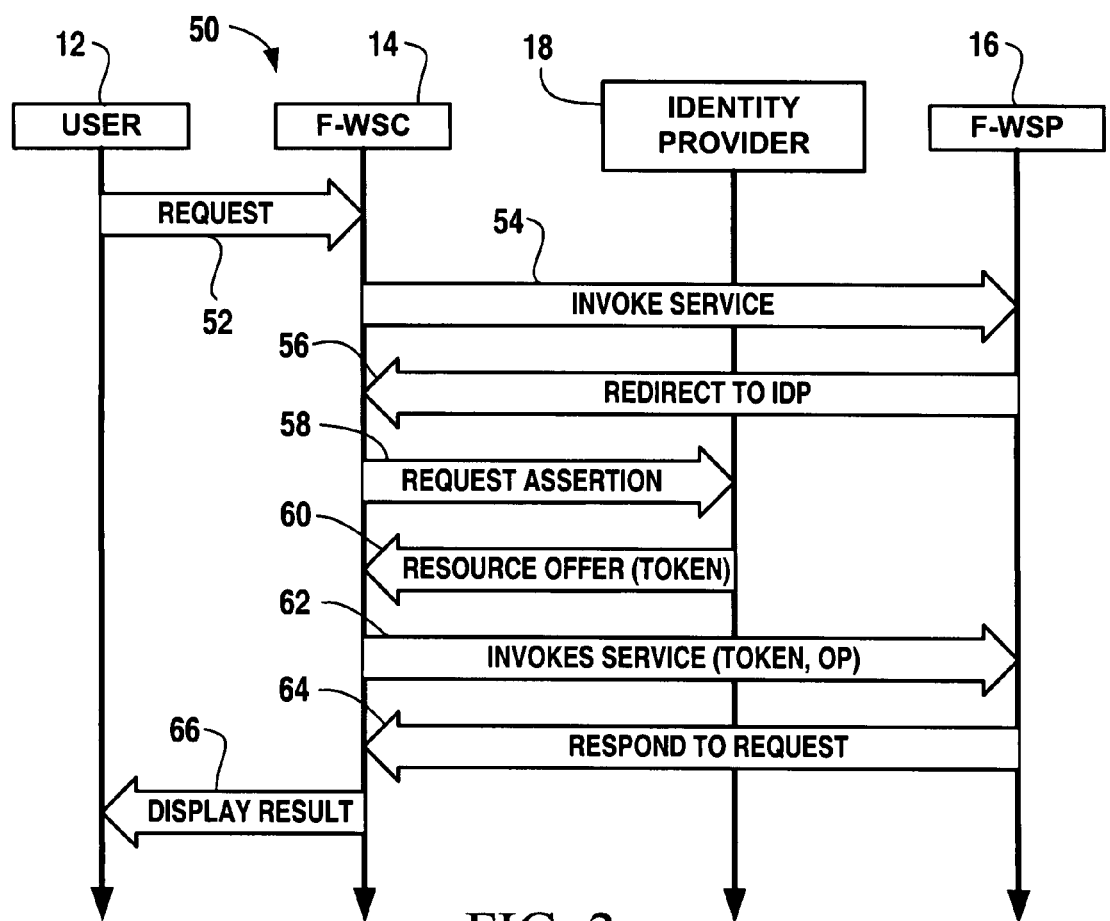
FIG. 2 shows a swimlane diagram illustrating an exemplary transaction for supplying federated web services.
Figure 3:
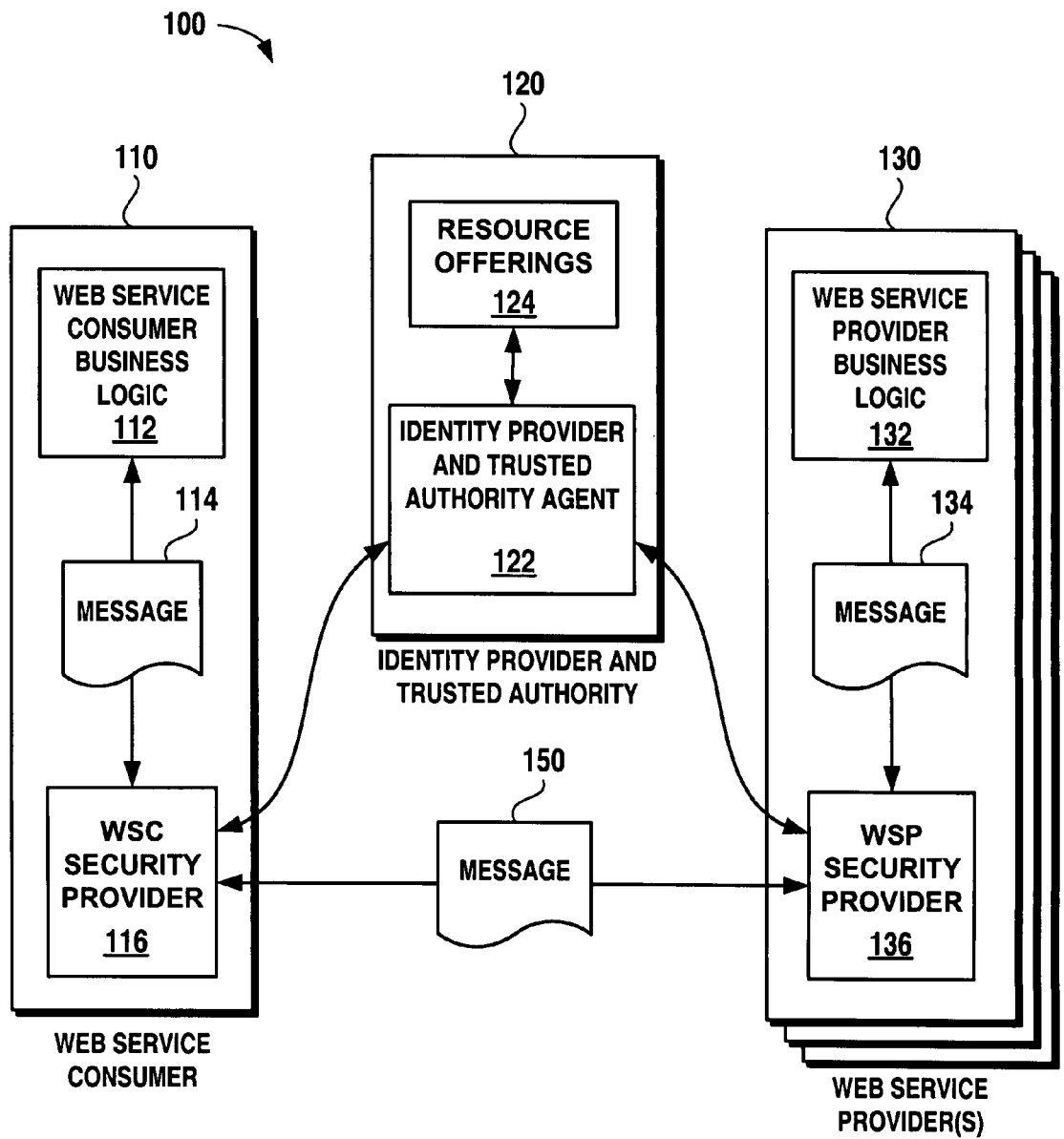
FIG. 3 shows by way of example federation system that is complimentary to existing federation specifications.

FIG. 3 shows by way of example federation system 100 that is complimentary to existing federation specifications. The example provides a plurality of participants. A participant can include a web services consumer (WSC) or a federation member. Federation members include web service providers (WSP), an identity providers (IDP), trusted authorities, and other providers such as attribute providers. In the implementation shown in FIG. 3, the participants include WSC 110, a unified IDP and trusted authority 120, and WSP 130. Other WSPs 140 may also be included as described in further detail below. Those skilled in the art will recognize that an actual implementation of a web service using a federated model may include fewer participants or other participants not mentioned. For example, the unified IDP and trusted authority 120 may divided into separate entities. Furthermore, an actual implementation may additionally include other providers in accordance with the federated model being implemented. For example, an attribute provider (now shown) may be provided in accordance with the federation specifications of the Liberty Alliance Project for providing attributes of a particular identity when authorized to do so.

Each participant may be implemented as a software application or component which can be executed in a container. A container may be a physical computer (e.g., as a network appliance) or a software implementation of an isolation layer between an application program and an underlying platform. For example, a container may be implemented as a Java™ Enterprise Edition (Java™ EE) virtual machine, a Microsoft® .NET Common Language Runtime, or a virtual machine implemented using hardware virtualization software such as that made commercially available by VMware, Inc. of Palo Alto, Calif. One physical computer may host multiple containers. Likewise, multiple physical computers operating in a parallel processing or distributed processing configuration can host one container.

WSC 110 comprises WSC business logic module 112 and a client security provider module 116. Each module may be implemented as a software application or component that executes in its container. In one embodiment, where the container is a Java™ EE virtual machine, the logic module is a software object. A software object is a well-understood concept in object-oriented programming. In general, a software object is an encapsulation of code that contains its own data and can be invoked using methods that are made available to other objects. Other programming paradigms can be employed in the implementation of business logic module 112 and client security provider module 116. In one embodiment, client security provider 116 is constructed using a Java Authentication and Authorization Service (JAAS) module, or according to Java Specification Request (JSR) 196.

WSC 110 may operate remotely or locally to a user, i.e., the person operating WSC 110. For example, WSC 110 may be a device, such as a hand-held wireless device that is in communication with a network that hosts federation system 100, such as the Internet. In one example, WSC 110 exists on a cell phone and WSP 130 is a calendar and scheduling service accessible via the Inernet. The user operating the cell phone can access his or her calendar by invoking WSC 110, which requests personal calendar information stored by WSP 130. In another embodiment, WSC is maintained by a web site that is accessed by a user using a web browser (not shown). The user may request their personal calendar information from WSP 130 by entering the URL a web portal. The web portal can dynamically generate HTML content tailored to the specific user accessing the portal. If the user information includes a calendar, then the portal can invoke WSC 110, which then fetches the user's calendar information from WSP 130. The portal can then format the calendar information in a graphically friendly manner and integrate the calendar into the HTML code which is then sent to the user's web browser.

A particular computer system can act as both a WSC and a WSP. For instance, WSP 130 may be an airline ticketing agent. WSC, a web portal, requests quotes for an airline ticket from a designated point of origin to a designated destination on a specific day, and sends this request to WSP 130. WSP 130 receives the request, and then invokes a plurality of WSCs (not shown) to obtain a plurality of quotes from a plurality of WSPs maintained by various airline companies. WSP 130 then receives the quotes from the airline companies and compiles them into a list which is then returned to WSC 110.

WSP 130 comprises a WSP business logic module 132 and a server security provider module 136. As with WSC 110, each module may be implemented as a software application, such as a software object, that executes in its container. In addition, server security provider 136 may also be constructed using a JAAS module.

In one embodiment, WSC business logic module 112 is an application configured to interact directly with a WSP over an Internet connection. WSC business logic module 112 therefore can be developed as a standard WSC application without regard to requirements of the web services federation. Likewise, WSP business logic module 132 may be an application configured to interact directly with a WSC and without additional security over the standard TLS layer over an Internet connection. WSP business logic module 132 can therefore be developed as a standard WSP without regard to the requirements of the web services federation. This greatly simplifies the development of WSC business logic module 112 and WSP business logic module 143.

Federation system 100 may include any number of additional WSPs 140. Each additional WSP 140 may provide a different service or product to WSC 110, or they may provide additional resources to provide the same service or product to WSC 110. For example, in addition to or instead of providing direct web services, WSP business logic 132 may perform administer and/or deploy web service instances, which can exist as additional WSPs 140. In addition, WSP business logic 132 may be responsible for registering, configuring, and administering the web service instances.

Identity provider (IDP) and trusted authority 120 includes agents 122 and resources 124 for carrying out the standard functions required of IDPs and trusted authorities, as dictated by the specifications of the federation. WSC 110, IDP and trusted authority 120, and WSP 130 therefore interact in the same manner mandated by whatever standard is adhered to by federation system 100.

A simple remote procedure call may be initiated when a user requests a particular service or product. The user may make such a request by interacting with WSC business logic module 112, which responds by issuing a query message 114 to an actual or fictitious WSP (not shown). The query message may be in the form of a remote procedure call (RPC) message. For example query message 114 may be formed in accordance with a standard RPC message format, such a SOAP message, which is a message that conforms to the SOAP protocol. As is generally understood in the art, the SOAP protocol includes a possibility of including both a header section and a body section. The SOAP protocol allows for a header portion so that information that is not application payload may be passed along with the message. According to LAP specifications, for example, the SOAP header may contain zero, one, or more security tokens, a user identifier, a WSC identifier, and attributes. A security token is an encapsulation of a security mechanism. Different web services may require different security mechanisms and therefore different types of security tokens. Each security token may be of a type specified according to the federated model. For example the security token may be implemented using Security Assertion Markup Language (SAML), x509, Kerberos, Binary, user ID and password, or other type of security token. Attributes may contain any information regarding the user, the transaction, the WSC, etc. In other federation specifications, the security tokens and other information may be provided in the body of the SOAP message, or provided using a different protocol altogether. For the purposes of this description, the term "header" in reference to messages, will relate to non-application payload information, such as security tokens and correspondent or correspondence identifiers and attributes.

Query message 114 generated by WSC business logic module 112 may or may not include a header. Furthermore, query message 114 may be addressed to a real or fictitious WSP. Thus, WSC business logic module 112 is not required to be aware of the actual location (i.e., URL address) of WSP 130. Furthermore, WSC business logic module 112 is not required to be aware of security mechanisms that are accepted by WSP 130.

Using a mechanism provided by the container, client security provider 116 intercepts query message 114, strips the envelope from the message, identifies the service name, queries IDP and trusted authority 120 for endpoint and security requirements of the service, injects an envelope and required header into query message 114, and then transmits resulting modified query message 150 to web service provider 130. If the client security provider does not have a valid security token, it may request one from IDP and trusted authority 120 in accordance with the existing protocols of the federation. Thus, client security provider 116 performs all the required functions necessary to conform to the federation protocol.

On the server side, server security provider 136 intercepts query message 150, extracts the security token, analyzes the security token to verify that it is an acceptable security token type and that it is valid, and passes the results of this determination to WSP business logic module 132, along with query message 134. Details of this operation are explained in more detail below with reference to FIGS. 4-6.

WSP business logic module 132 will ordinarily respond to the query by a response message. The response message is intercepted by server security provider 136 which attaches necessary addressing and security mechanisms as described above, and transmits the modified response message to WSC 110, wherein client security provider 116 intercepts the message, confirms that the message is authentic (e.g., that the security token is valid) strips out the header, and passes the modified response message to WSC business logic module 112.

One feature of federation system 100 is the separation of WSC and WSP business logic modules 112, 132 from client and server security providers 116, 136. In effect, each business logic module delegates security functionally to a corresponding security provider module.

Figure 4:
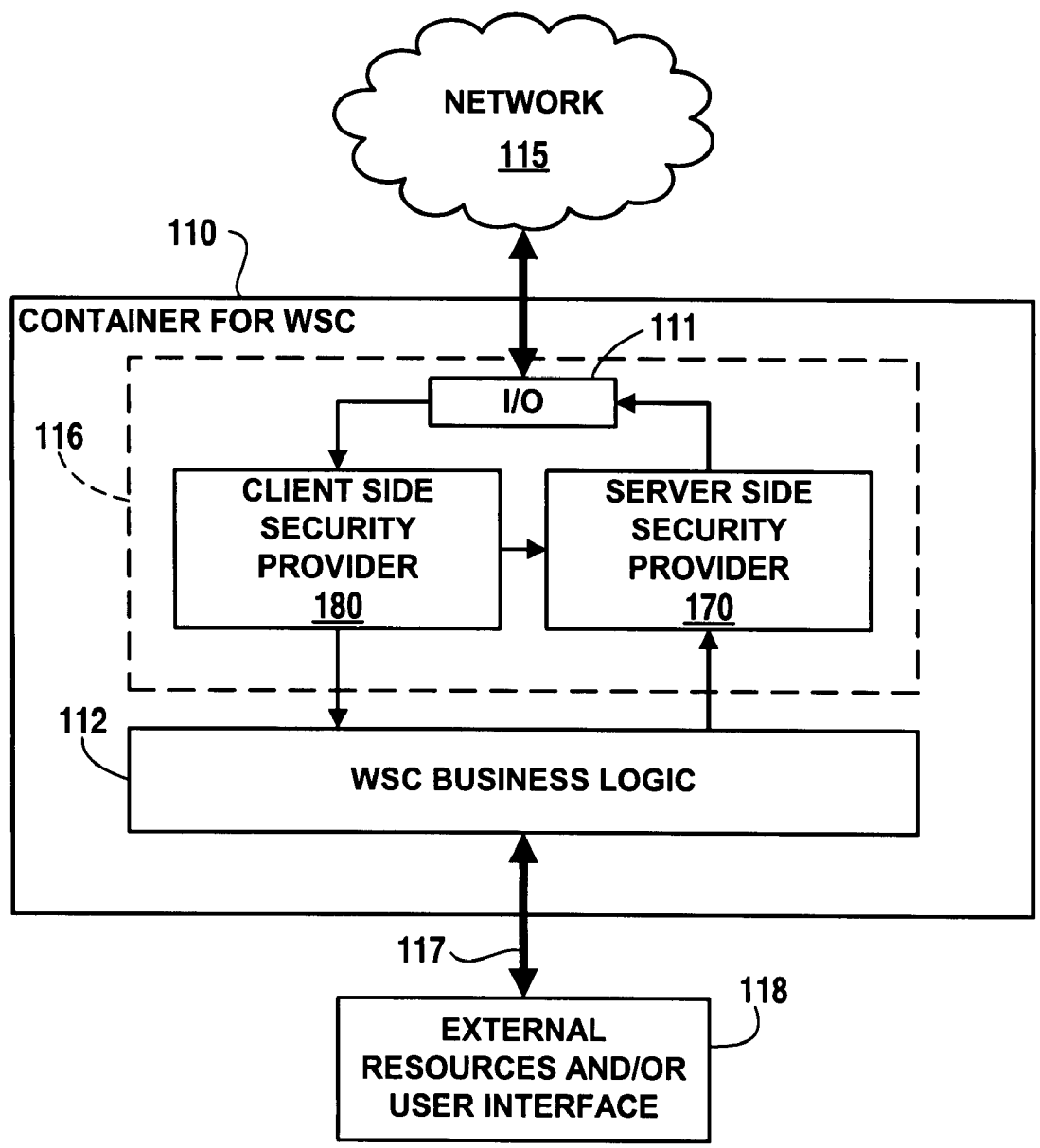
FIG. 4 shows a schematic diagram illustrating an exemplary configuration and connectivity for the WSC of FIG. 3.

FIG. 4 shows a schematic diagram illustrating an exemplary configuration and connectivity for WSC 110. As mentioned above with respect to FIG. 3, WSP 110 may be implemented as an appliance, a computer program, a device, or in a Java™ EE virtual machine, a .NET Common Language Runtime, other container providing similar functionality. In a typical embodiment, a user (not shown) interacts with a device, computer system, web page, etc., and causes WSC business logic module 112 to generate an outgoing query message requesting a product or service from a remote web service provider.

As mentioned previously, WSC business logic module 112 can operate as though it is interacting directly with a WSP that is not part of a federation. However, WSC security provider 116 intercepts the query message and performs processing operations as described in more detail below with reference to FIG. 7. WSC security provide may implement this operation using an internal client side security provider 180 and server side security provider 170, as well as an in/out (I/O) module 111. Client side security module 180 is responsible for receiving incoming messages from network 115 and server side security module 170 is responsible for sending outgoing messages over network 115. Together, these modules implement protocol and security requirements of the federation and WSP being accessed.

Figure 5:
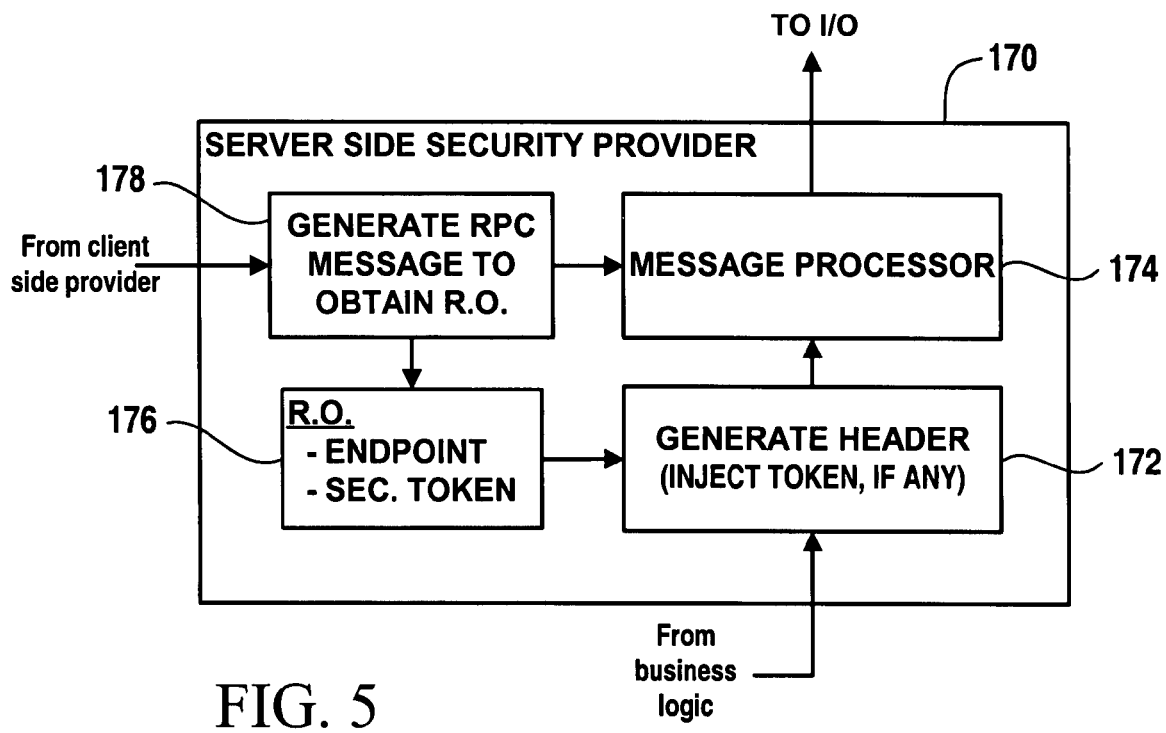
FIG. 5 shows by way of example a functional block diagram of server side security provider of the WSC of FIGS. 3 and 4.

FIG. 5 shows by way of example a functional block diagram of server side security provider 170. Module 172 receives an outgoing query message from business logic module 112 (FIG. 4) and generates a header for the intended recipient. In one embodiment, module 172 reads the SOAP envelope to determine an intended recipient or the SOAP message body to determine an intended service. From this information a new header is generated having an envelope addressed to the intended recipient or service. It should be noted that the query message received by module 172 may or may not address an actual WSP. For example, module 172 may contain a translation table to translate the address generated by WSC business logic module 112 to an actual address of the intended recipient. Use of a translation table allows a simple mechanism to update the addresses if the WSP addressed by WSC business logic module 112 is moved or substituted. Module 172 may be aware that the WSP being addressed has certain authentication and security requirements. If authentication has already been performed, then a security token is injected into the header by module 172.

Then, in module 174, the query message is processed by stripping out the original header or envelope supplied by WSC business logic module 112 and inserting the header generated by module 172. Message processor module 174 then forwards the modified message to I/O module 111 (FIG. 4) which, in one embodiment, may package the modified message into network packets for transmission over a network in the known manner. It is possible that authentication has not been performed, or that module 172 is unaware of the security mechanism types that are permitted by the recipient WSP. In this case, module 178 can generate a query message to authenticate and obtain a resource offering for the recipient WSP in accordance with the federation protocol. This may, for example, involve generating an query message to IDP and trusted authority 120 (FIG. 3). The response is then passed by client side security provider 180 (FIGS. 4, 6) to module 178 which forwards resource offering 176, which may contain an endpoint (e.g., address) of the recipient WSP and a security token. The resource offering 176 is then passed to module 172 which inserts the security token and generates the envelope to match the endpoint of the resource offering. This header is then passed to message processor module 174 which attaches the header and envelope information to the message in accordance with, for example, the SOAP protocol as described above.

The query message 150 (FIG. 3) transmitted by server side security provider 170 may then be acted upon by the recipient WSP, which then generates an RPC response message which is received in client side security module 180.

Figure 6:
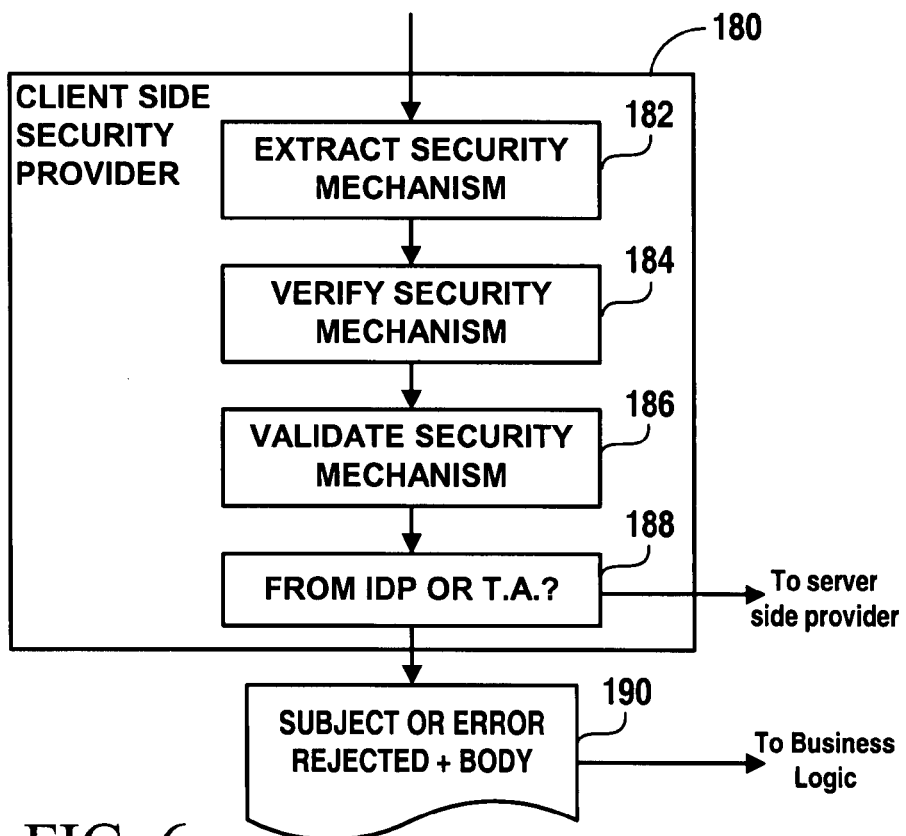
FIG. 6 shows by way of example a functional block diagram of client side security provider of the WSC of FIGS. 3 and 4.

FIG. 6 shows by way of example a functional block diagram of client side security provider 180 of WSC security provider 116 of WSC 110 (FIG. 3). As represented in FIG. 6, a first module 182 receives an incoming response message from a remote WSP and extracts any security mechanism, such as a security token from the message header. It should be noted that not all response messages will require additional security over the standard TLS security layer for Internet protocol. If not additional security is provided, the message may be passed through directly to module 188. Module 184 receives the security mechanism, if any, and verifies that it is the correct type of security mechanism. Module 186 can validate the security mechanism to ensure that it is genuine and that the message has not been corrupted or tampered with, e.g., by comparing hash values. Module 188 can check whether the response message is from an IDP or trusted authority, such as IDP and trusted authority 120 in FIG. 3. If so, then the message is a federation-specific message and can be passed directly to server side security provider 170 as described above with reference to FIG. 5. Otherwise, the message subject and body and/or error message 190 is passed to WSC business logic 112 (FIG. 4). An error may, for example, be generated when the security mechanism cannot be verified or validated. Client side security provider 180 can be configured as to how such errors are handled, depending on the preferences of the deployer. For example, client side security provider 180 may pass error messages to business logic 112 and/or server side security provider 170, which can then send a request for retransmission of the response to the WSP.

Figure 7:
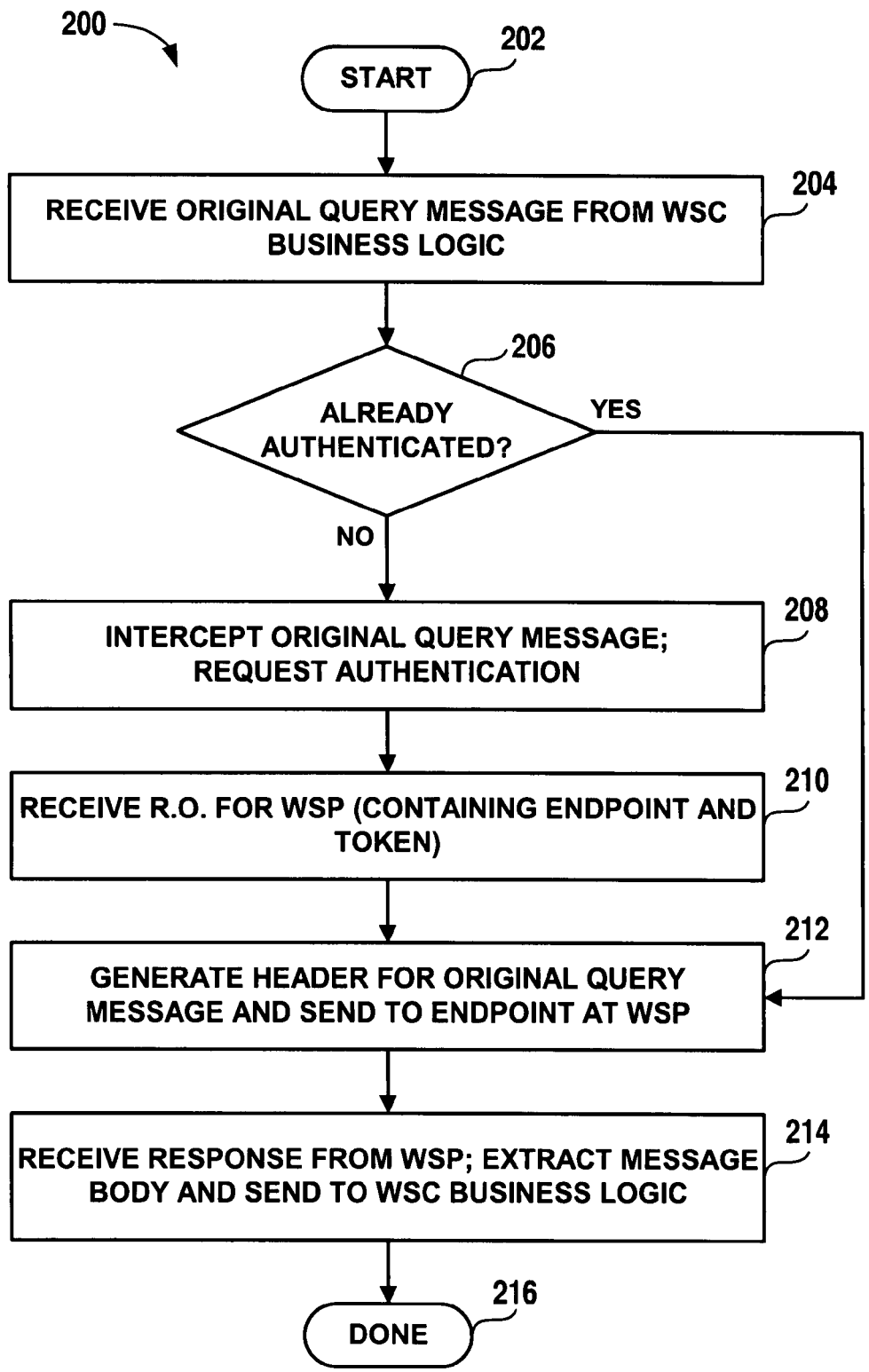
FIG. 7 shows a flowchart representing by way of example a procedure carried out by the WSC security provider of FIGS. 3 and 4.

FIG. 7 shows a flowchart 200 representing by way of example a procedure carried out by WSC security provider 116 described above with reference to FIGS. 3 and 4. It should be recognized that this procedure is exemplary and that other procedures, not herein described, may be implemented by WSC security provider 116. Such other procedures may be implemented in order to conform with the requirements and protocol of the particular federation of which WSC security provider 116 is a member.

The procedure begins as indicated at start block 202 and flows to operation 204, wherein an outgoing original query message is received from WSC business logic. The WSC security provider can determine from the original query message an intended WSP recipient. For example, the WSC security provider may maintain a table that identifies an intended WSP recipient based on the contents of the envelope of the original query message. The WSC security provider then determines, in operation 206, whether the WSC is already authenticated to the intended WSP recipient. If the WSC is already authenticated, then the procedure jumps to operation 212. Otherwise, the procedure flows to operation 208, wherein the WSC security provider intercepts the original query message and generates an authentication query addressed to an identity provider that is a member of a federation with the intended WSP recipient. In response to the authentication query, the WSC security provider receives a resource offering containing a security token in operation 210. The resource offering includes a token that can be used to show that the WSC is authenticated with the identity provider. In operation 212, the WSC security provider generates a header for the original query message. The header will include any required tokens as received in operation 210 as well as the correct envelope addressing information (e.g., endpoints) for the intended WSP recipient. The header is then attached to the body of the original query message to generate a modified query message, which is then transmitted to the intended WSP recipient. A response message is then received from the WSP in operation 214. The message body is extracted from the response message and sent to the WSC business logic. The procedure then ends as indicated by done block 216.

Figure 8:
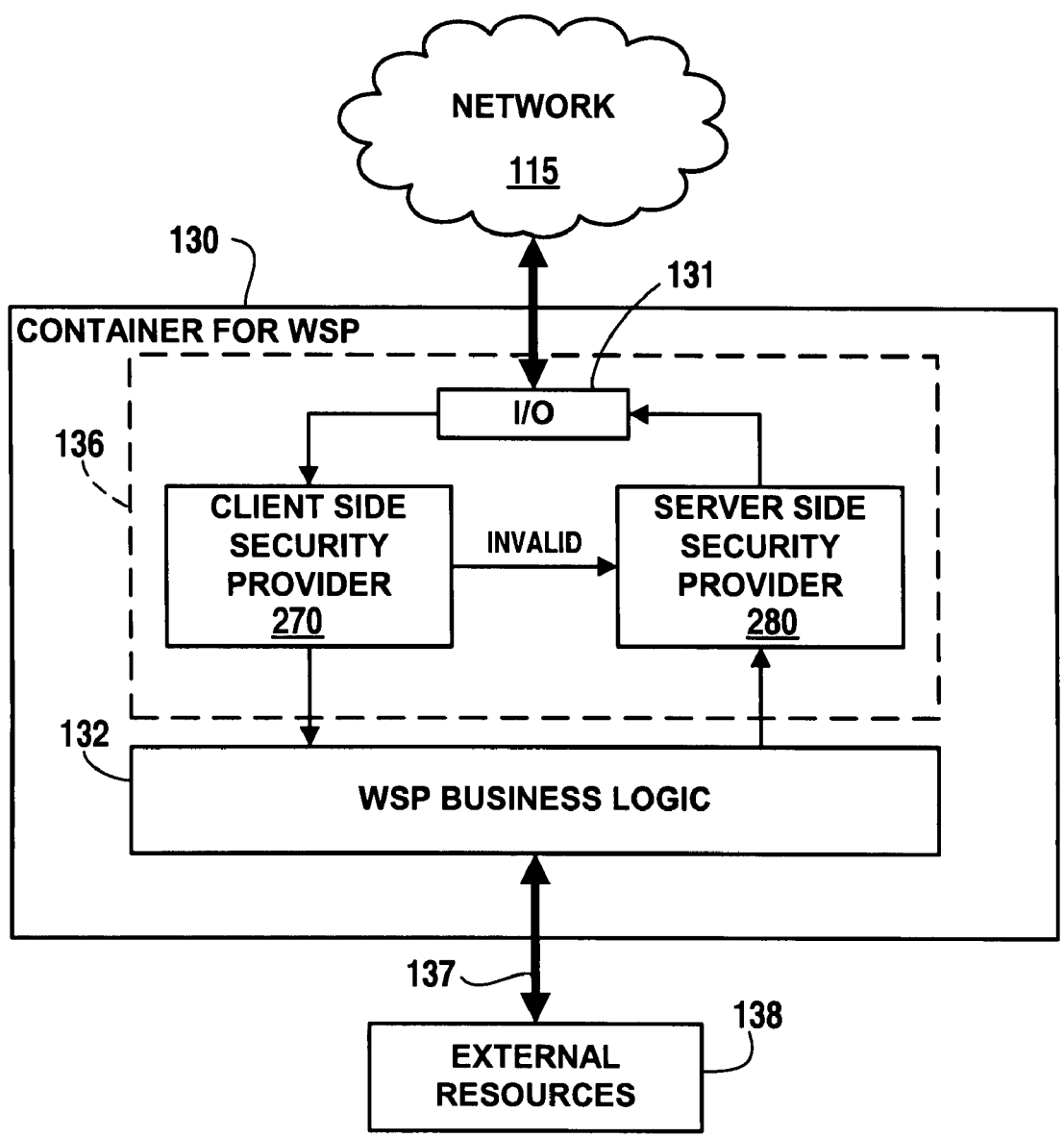
FIG. 8 shows a schematic diagram illustrating by way of example a configuration and connectivity of the WSP of FIG. 3.

FIG. 8 shows a schematic diagram illustrating by way of example a configuration and connectivity for WSP 130. As mentioned above with respect to FIG. 3, WSP 130 may be implemented as an appliance, a computer program, or in a Java™ EE virtual machine, a .NET Common Language Runtime, other container providing similar functionality. In a typical embodiment, WSP 130 receives an incoming query message from a remote WSC, accesses external resources 138 to satisfy the query, and respond with a response message. External resources 138 may be local or remotely accessed via connection 137.

WSP security provider 136 implements the federation protocol and enforces a security regime according to a policy selected by the deployer of WSP 130. Policy selection and deployment may be made, for example, as described in related U.S. patent application Ser. No. 11/462,780 entitled, "Deployment Tool And Method For Managing Security Lifecycle Of A Federated Web Service" and filed on Aug. 7, 2006, which is incorporated herein by reference.

As mentioned previously, WSP business logic module 132 can operate as though it is interacting directly with a WSC that is not part of a federation. However, WSP security provider 136 intercepts the outgoing response messages received from WSP business logic 132 and performs processing operations as described in more detail below with reference to FIGS. 10 and 11. WSP security provide 136 may implement this operation using an internal client side security provider 270 and server side security provider 280, as well as an in/out (I/O) module 131. Client side security provider module 180 is responsible for receiving incoming messages from network 115 and server side security provider 280 is responsible for sending outgoing messages over network 115. Together, these modules implement protocol of the federation and security policies selected by the deployer.

Figure 9:
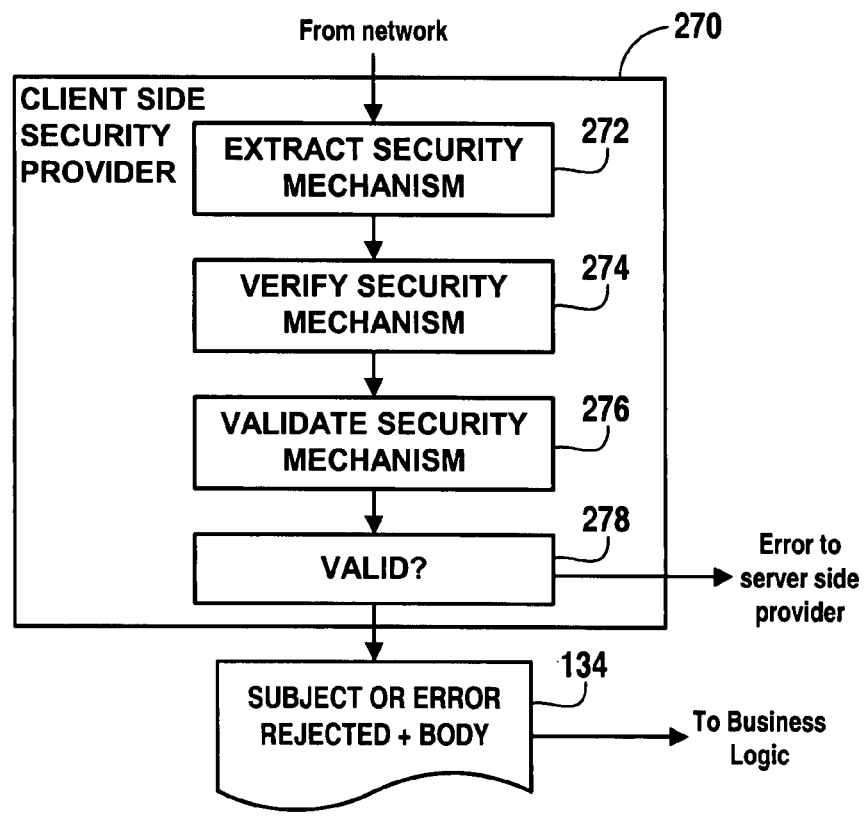
FIG. 9 shows by way of example a functional block diagram of a client side security provider of the WSP security provider of FIGS. 3 and 8.

FIG. 9 shows by way of example a functional block diagram for client side security provider 270 for WSP security provider 136 of WSP 130. Each functional block represents an operation or a software component for carrying out an operation in a computer system or container. Module 272 receives an incoming message query from a remote WSC and extracts the security mechanism, if any. Module 274 compares the type of security mechanism incorporated into the message query with a list of accepted types of security mechanisms according to the WSP policy as determined by the deployer of the WSP. If the security mechanism type matches one of the types on the list of accepted types, then the security mechanism is referred to has having been "verified." Module 276 may perform decryption of the message body, if required, and determines whether the security mechanism is valid. A valid security mechanism may authenticate the WSC that sent the query message and ensure that the message integrity has not been compromised, e.g., by comparing hash values. Module 278 forwards the incoming query message 134 or a portion thereof including the decrypted message body to WSP business logic 132 (FIGS. 3, 8). In one embodiment, any errors generated are passed to business logic as well. However, if the security mechanism is of the incorrect type (not verified) or invalid, then the error, in one embodiment, is passed directly to WSP server side provider 280, described below with reference to FIG. 10.

Figure 10:
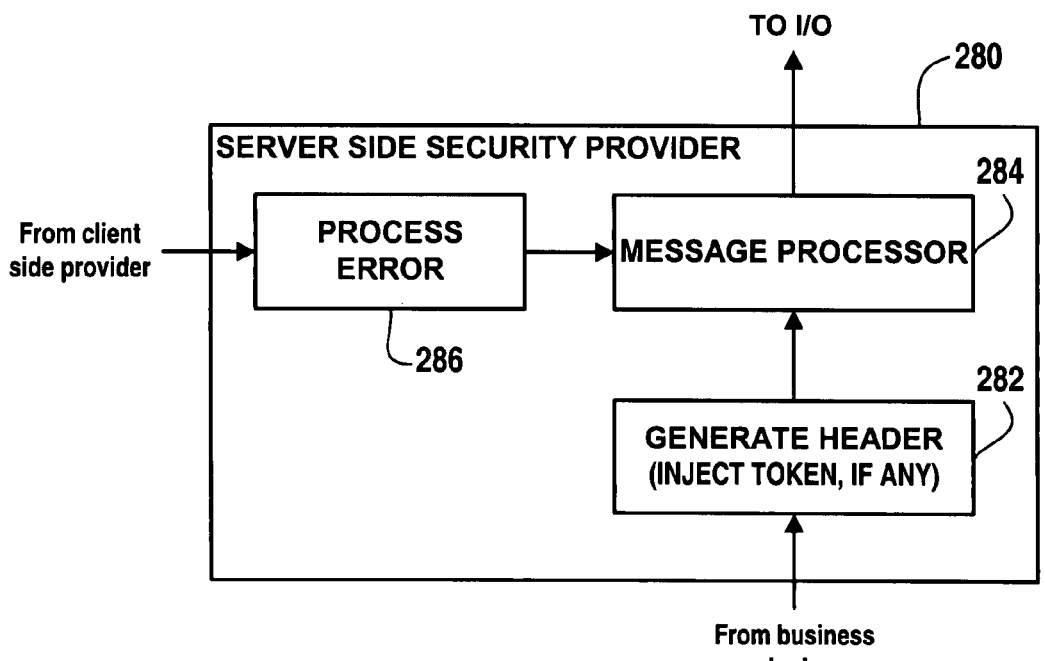
FIG. 10 shows by way of example a functional block diagram of a WSP server side security provider of the WSP security provider of FIGS. 3 and 8.

FIG. 10 shows by way of example a functional block diagram of WSP server side security provider 280. WSP server side security provider 280 includes module 282 for receiving an outgoing response message from WSP business logic 132 (FIGS. 3, 8), and generating a new message header that is federation compliant with regard to any security mechanism, attributes, and envelope data in the manner described above with reference to module 172 in FIG. 5. Module 284 receives the response message and combines that with the header generated by module 282. The modified response message is then sent over the network back to WSC that initiated the communication. In the case where a received query message is invalid or cannot be verified, an error arrives at module 286. Module 286 then generates a response message containing the error message for the initiating WSC. The error message may then be passed to message processor module 284 for delivery to the initiating WSC.

Figure 11:
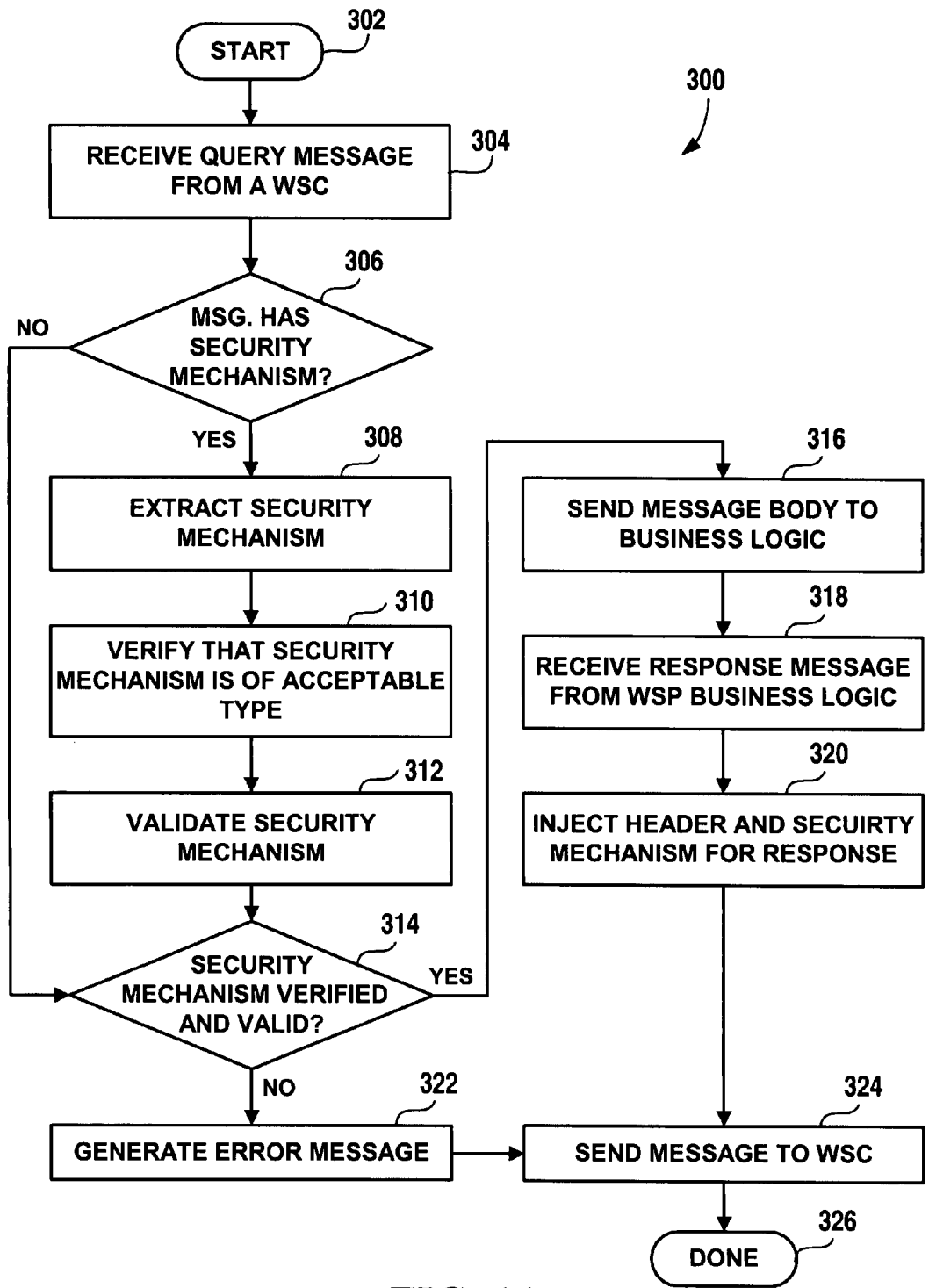
FIG. 11 shows a flowchart depicting by way of example a procedure carried out by the WSP security provider of FIGS. 3 and 8.

FIG. 11 shows a flowchart 300 depicting by way of example a procedure carried out by WSP security provider 136 (FIGS. 3, 8). It should be recognized that this procedure is exemplary and that other procedures, not herein described, may be implemented by WSP security provider 136. Such other procedures may be implemented in order to conform to the requirements and protocol of the particular federation of which WSP is a member.

The procedure begins as indicated at start block 302 and proceeds to operation 304 wherein an incoming query message is received from a WSC, such as WSC 210 (FIG. 3). In operation 306, the header portion of the query message is analyzed to determine whether it includes a security mechanism, such as a token. If a security mechanism is not included, then the procedure jumps to operation 314. Otherwise, the procedure flows to operation 308.

In operation 308, the security mechanism is extracted from the incoming query message. In operation 310, the security mechanism type is compared to acceptable types according to a policy of the WSP, which may be selected by the deployer of the WSP. Some mechanism types provide greater security than other types, and the type or types selected by the deployer of the service may be determined, at least in part, on the sensitivity of the information being requested or received.

In operation 312, the security mechanism as analyzed to determine whether it is valid. If the security type is determined to not be a permitted type in operation 310, then operation 312 can be skipped. A valid security mechanism can establish, for example, that the sender of the query message is authentic, i.e., that he, she, or it, is who they say they are by virtue of having been authenticated by an IDP that is part of the federation. The valid security mechanism may also show that the message body portion of the query message has not been tampered with or is otherwise not corrupted or compromised.

Next, in operation 314, it is determined whether the security mechanism, if any, is verified and valid. If the security mechanism is verified and valid, then the procedure flows to operation 316. If there is no security mechanism, but none is required, the procedure also flows to operation 316. However, if the security mechanism is not verified, invalid, or required but not present, then the procedure flows to operation 322.

In operation 316, the message body is sent to WSP business logic 132 (FIG. 3). In operation 318, after some time, an outgoing original response message may be received from WSP business logic 132. The original response may provide information requested by the query message, or it may simply be an acknowledgement. In operation 320, the response message generated by the WSP business logic may be modified by stripping the original header and envelope (if any) and inserting a new envelope and header information, including a security mechanism (if required). The new header and security mechanism provide correct address and security protocol in accordance with the requirements of the federation protocol. The message body may furthermore be encrypted according to the security mechanism. The processing of the original response message will result in modified response message in conformance with security requirements set by WSP policy and federation protocol. As noted, each federation may be unique requirements according to the agreements reached by the partners that have set up the federation.

In operation 324, the modified response message is sent to the WSC that sent the query message received in operation 304. In operation 314, if a message is missing a required security mechanism, or a provided security mechanism is invalid or is an incorrect type, then the procedure flows to operation 322 wherein a response message is generated containing the error message. The procedure then flows to operation 324 wherein the response/error message is sent to the WSC. After sending the response message in operation 324, the procedure ends as indicated in operation 326.

Figure 12:
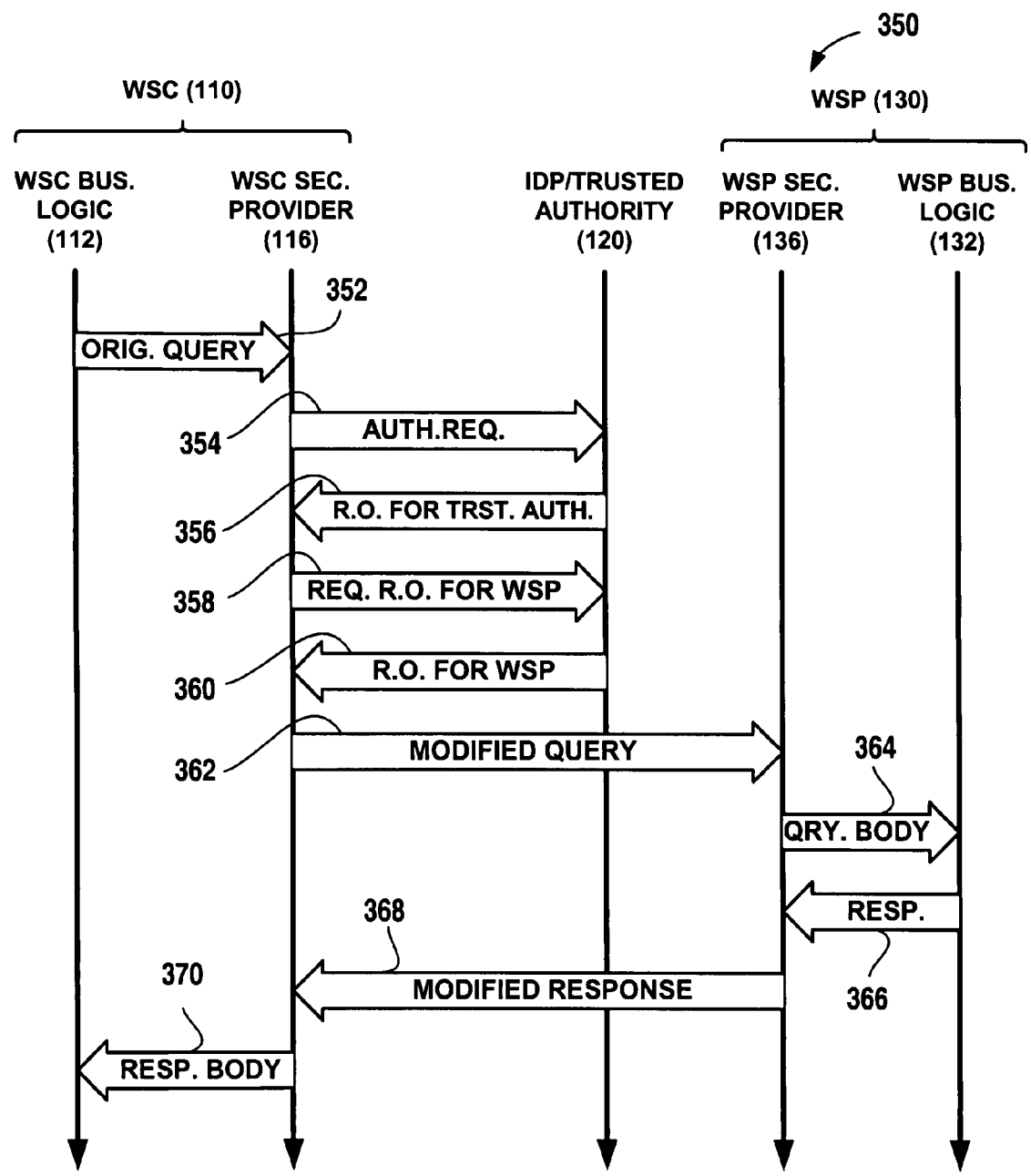
FIG. 12 shows a swim lane diagram 350 which depicts, by way of example, an interaction between the components of the federation system of FIG. 3.

FIG. 12 shows a swim lane diagram 350 which depicts, by way of example, an interaction between the components of federation system 100 (FIG. 3). WSC business logic 112 generates and transmits an original query 352 which is intercepted by WSC security provider 116. WSC security provider 116 identifies recipient WSP 130, e.g., by identifying the intended recipient on the envelope and translating that to an actual recipient using a locally maintained translation table. WSC security provider 116 may further determine, based on locally available information, that WSP requires authentication. Therefore, WSP generates an authentication request 354 which it transmits to IDP/trusted authority 120. The authentication request may provide authenticating information such as a password and identifier, or other information required by trusted authority 120. In response IDP/trusted authority generates a resource offering 356 containing an assertion as to the identity of WSC 110. WSC security provider 116 receives resource offering 356 and includes it with a request 358, requesting a resource offering for WSP 130. The resource offering for WSP 130 may include security requirements and/or address information (i.e., endpoints) needed to access WSP 130. In this case, IDP/trusted authority acts as a "registry" or "discovery service" that provides information on WSPs of the federation. IDP/trusted authority 120 responds to request 358 with a resource offering 360 containing the requested information, e.g., the address and security requirements of WSP 130.

After receiving resource offering 360, WSC security provider 116 has all the information needed to transmit a query to WSP 130. This information includes an assertion by an IDP of the federation and the address and security requirements of WSP 130. The "security requirements" may, e.g., include a list of acceptable security mechanism types. WSC security provider 136 then processes original query 352 by stripping the original envelope, generating a new envelope and adding a header including an acceptable type of security mechanism and the assertion proving authentication. These elements are combined into modified query 362 which is transmitted to WSP 130.

Modified query 362 is intercepted by WSP security provider 136. The message is analyzed to determine whether the security mechanism is an acceptable type and is valid. If so, then the query message body 364 is forwarded to WSP business logic 132. WSP business logic 132 may then respond with a response message 366, which may be addressed to a real or fictitious WSC. However, response message 366 is intercepted by WSP security provider 136. WSP security provider 136 modifies response message 366 by stripping the original envelope and inserting a correct envelope, and by injecting any security mechanisms required according to WSP policy. The resulting modified response 368 is then transmitted to WSC 110. WSC security provider 116 intercepts modified response 368 and validates the security mechanism, including performing any required decryption, and forwards the response message body 370 to WSC business logic 112.

While the RPC paradigm (query and response) exemplified by the swim lane diagram described above with reference to FIG. 12 is well suited for a variety of situations, there are many transactions for which the RPC is not suited. For example, there are many business problems requiring long-running transactions that cannot be adequately addressed by RPCs in web services. Long-running transactions are transactions that generally cannot be handled in real-time. For example, a client may request a sales or rental quote from a broker-server, which then must check rates and availability before returning with a result. In this case, the server can send a quick acknowledgement of the request, and may not return with a result for some time. In many cases, the request could initiate a complex series of messages between various service providers in an effort to gather the necessary information. These transactions may be referred to as "asynchronous conversational transactions." An interaction is said to be "asynchronous" when the associated messages are chronologically and procedurally decoupled. A Web service "conversation" involves maintaining some state information during a transaction involving multiple messages or participants. It should be recognized that while the WSC and WSP security providers described above are mentioned with respect to an RPC transaction types, i.e., queries and responses, other transaction types such as asynchronous transactions could also be supported. The terms, "query" and "response" should therefore not be understood as being necessarily restricted to an RPC transaction. In general, the term "query" is applied to any message transmitted by a WSC and the term "response" is applied to any message transmitted by a WSP in response to the query. For example, the "query" may not be a request for information, but instead may provide information to the WSP that was requested by the WSP in a previous communication. Furthermore, there may be multiple responses to a single query in asynchronous conversational transactions.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. In addition, the invention may be encoded in an electromagnetic carrier wave in which the computer code is embodied.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
   one or more processors;
   memory and storage; and
   a federation participant in communication with other participants of a federation according to a federation protocol, the federation participant further comprising:
   a business logic, the business logic being one of a web service consumer (WSC) business logic or a web service provider (WSP) business logic, the business logic being a software component configured to execute within a container on a computer, the business logic being configured to generate an outgoing message for transmission to a fictitious recipient and receive an incoming message from a WSP if the business logic is a WSC business logic and a WSC if the business logic is a WSP business logic;

a security provider, the security provider being configured to execute in the container with the business logic, the security provider receiving the generated messages and applying header information to the outgoing message according to the federation protocol and a list of permitted security mechanism types to form a modified outgoing message, the security provider then transmitting the modified outgoing message to a real recipient.

2. The apparatus of claim 1, wherein the security provider authenticates itself with an identity provider to obtain an assertion, the assertion attesting to the identity of the federation participant.

3. The apparatus of claim 2, wherein the security provider communicates with a trusted authority to obtain a resource offering containing data relating to the real recipient, the data relating to the real recipient including an endpoint address and security requirements for the recipient.

4. The apparatus of claim 1, wherein the business logic is configured to transmit the outgoing message to the fictitious recipient and the security provider is configured to intercept the outgoing message being transmitted by the business logic and prevent transmission of the outgoing message prior to being modified.

5. The apparatus of claim 1, wherein the security provider is further configured to receive an incoming message from the real recipient, the incoming message being transmitted in conformance with the federation protocol, the security provider being configured to validate any security mechanisms incorporated into the incoming message and pass a message body of the incoming message to the business logic.

6. The apparatus of claim 1, wherein the federation participant is a web service consumer, the real recipient is a web service provider, the outgoing message is a remote procedure call (RPC) query, and the incoming message is an RPC response.

7. The apparatus of claim 1, wherein the federation participant is a web service provider, the real recipient is a web service consumer, the outgoing message is a remote procedure call (RPC) response and the incoming message is an RPC query.

8. The apparatus claim 7, wherein the security provider is further configured to receive the RPC response from the web service consumer, the security provider being configured to verify that the RPC response is provided with a security mechanism is of an acceptable type according to a predetermined policy.

9. A method for accessing a web service provider (WSP) at a web service consumer (WSC), the method comprising:
using a WSC business logic to generate an original query message to a fictitious WSP, wherein the WSP and WSC are participants in a federation according to a federation protocol;
receiving the original query message in a security provider;
identifying a real WSP that is an intended recipient of the original query message;
processing the original query message to generate a modified query message that conforms to the federation protocol, the modified query message including a header with a security mechanism selected by the security provider from a list of permitted security mechanism types; and
transmitting the modified query message to the real WSP over a network from the security provider, the WSC business logic and the security provider each being a distinct software module executing within a container on a computer.

10. The method of claim 9, wherein the WSC business logic performs operations to transmit the original query message, the method further comprising intercepting the original query message and preventing the transmission of the original query message, the security provider operating to perform the intercepting and preventing.

11. The method of claim 9, wherein the processing of the original query message comprises:
stripping an envelope from the original query message, and applying a new envelope, the new envelope including endpoint information of the real WSP.

12. The method of claim 9, further comprising:
identifying whether the real WSP requires authentication;
generating a query message to request authentication from an identity provider;
receiving an assertion from the identity provider, the assertion including information that is usable by the real WSP to authenticate the WSC; and
incorporating the assertion into the modified query message.

13. The method of claim 9, further comprising:
determining whether an endpoint address and security requirements of the real WSP are known;
generating a query message to request a resource offering relating to the real WSP, the resource offering including an endpoint address of the real WSP and permitted security mechanism types;
encoding the modified query message using a security mechanism type acceptable to the real WSP according to the resource offering and addressing an envelope of the modified query message using the endpoint address provided in the resource offering.

14. The method of claim 9, further comprising:
receiving a response message from the real WSP;
decoding and validating any security mechanism provided with the response message; and
passing a message body of the response message to the WSC business logic.

15. A method for providing a web service at a web service provider (WSP) to a web service consumer (WSC), the method comprising:
receiving a query message from a real WSC over a network in a security provider, wherein the WSP and WSC are participants in a federation according to a federation protocol and wherein a header for the query message conforms to the federation protocol;
identifying a security mechanism incorporated into the header for the query message;
verifying that the security mechanism corresponds to an acceptable type of security mechanism selected by the real WSC from a list of permitted security mechanism types;
validating the security mechanism, the validating including determining that the real WSC is authenticated and that the message integrity is not compromised;
extracting a message body from the query message; and
sending the message body to WSP business logic from the security provider, the security provider and the business logic each comprising a distinct software module executing within a container on a computer; and using a WSP business logic to generate an original response message addressed to a fictitious WSC.

16. The method of claim 15, wherein the WSP business logic is configured to communicate directly with the real WSC and the message body is sent to the WSP business logic in a manner allowing the WSP business logic to receive the message body as though it was received directly from the real WSC over the network.

17. The method of claim 15, further comprising:

generating an error message for transmission to the real WSC when the query message has an unacceptable security mechanism type and when the query message cannot be validated; and transmitting the error message to the real WSC over the network.

18. The method of claim 15, further comprising:

receiving the original response message in the security provider;

identifying a real WSC that is an intended recipient of the original response message;

processing the original response message to generate a modified response message, the modified query message including a header and security mechanism according to requirements of the real WSC; and transmitting the modified response message to the real WSC.

19. The method of claim 15, wherein the WSP business logic performs operations to transmit the original response message, the method further comprising intercepting the original response message and preventing the transmission of the original response message, the security provider operating to perform the intercepting and preventing.

20. The method of claim 15, wherein the processing of the original response message comprises:

stripping an envelope from the original response message, and applying a new envelope, the new envelope including endpoint information of the real WSC.

\* \* \* \* \*